United States Patent [19]

Lohner

[11] Patent Number: 5,396,693

[45] Date of Patent: Mar. 14, 1995

[54] PRECISION BORING TOOL AND METHOD OF PRODUCING TOOL CARTRIDGE

[75] Inventor: Klaus Lohner, Penfield, N.Y.

[73] Assignee: Parlec, Inc., Fairport, N.Y.

[21] Appl. No.: 626,521

[22] Filed: Dec. 12, 1990

[51] Int. Cl.[6] .......................... B23P 15/00; B23B 51/00
[52] U.S. Cl. ................... 29/527.1; 408/153; 408/181
[58] Field of Search .................. 29/527.1, 527.5, 530; 408/151, 153, 155, 181, 185; 75/424.8 A, 424.8 R, 89.15; 411/82

[56] References Cited

U.S. PATENT DOCUMENTS

| | | | |
|---|---|---|---|
| 2,282,919 | 5/1942 | Zempel | 408/181 |
| 3,937,587 | 2/1976 | Lindem | 408/181 |
| 4,018,342 | 4/1977 | Lindsay | 408/153 |
| 4,398,854 | 8/1983 | Pape et al. | 408/185 |
| 4,723,767 | 2/1988 | McPherson et al. | 269/32 |
| 4,761,103 | 8/1988 | Krstovic | 408/181 |
| 4,784,536 | 11/1988 | Pfalzgraf | 408/181 |
| 4,790,971 | 12/1988 | Brown et al. | 74/424.8 R |

FOREIGN PATENT DOCUMENTS

| | | | |
|---|---|---|---|
| 2931302 | 2/1981 | Germany | 408/181 |
| 3700693 | 7/1988 | Germany | 74/89.15 |

*Primary Examiner*—William Briggs
*Attorney, Agent, or Firm*—Shlesinger, Fitzsimmons & Shlesinger

[57] ABSTRACT

A removable boring tool cartridge has a cylindrical tool carrier axially adjustable in a bore in a cartridge housing by means of an adjusting screw having a head rotatably adjustable in the bore of an annular thrust bearing, which is secured around the outside thereof in one end of the bore in the housing by an injection molded plastic safety ring. The adjusting screw has an externally threaded shank that projects in radially spaced coaxial relation into a bore in one end of the tool carrier, to the opposite end of which is fastened an insert holder. A plastic sleeve nut is injection molded into the radial space in the bore in said tool carrier to surround and have driving engagement with the externally threaded shank of said screw.

12 Claims, 3 Drawing Sheets

PRECISION BORING TOOL AND METHOD OF PRODUCING TOOL CARTRIDGE

BACKGROUND OF THE INVENTION

This invention relates to a high precision boring tool, and more particularly to a novel tool bit or insert holding cartridge therefor. Even more particularly this invention relates to a novel method of producing an adjustable tool cartridge for use with high precision boring tools.

Heretofore it has been customary to provide boring tools with adjustable tool holders, which can be adjusted radially of the axis of rotation of the associated boring head, thereby to increase or decrease the diameter inscribed by the tool. In U.S. Pat. No. 4,398,854, for example, the tool holder is mounted for radial adjustment in the head of a boring bar by means of a rotatable adjusting screw, which has a shank that threads into a bronze nut secured in the inner end of the tool holder. By rotating the adjusting screw the tool holder can be advanced inwardly or outwardly of a bore formed in the boring bar head transversely of its axis.

While tool adjusting means of the type disclosed in the above-noted patent enables ready radial adjustment of the tool bit it does not eliminate undesirable backlash which can result because of any lost motion or play as between the adjusting screw and nut connection which functions to adjust the tool. Moreover, the adjusting means disclosed in this prior art patent comprises several cooperating elements which must be carefully machined to enable even a modest degree of accuracy to be achieved by the adjusting means. It is an object of this invention, therefore, to provide for a boring tool a novel tool cartridge having therein improved tool adjusting means, which substantially eliminates any. undesirable backlash that might occur during the adjustment of the tool, thereby providing a substantially improved precision boring tool.

Another object of this invention is to provide a novel cartridge of the type described, which can be made and utilized separately from any given boring bar, and hence can be produced and marketed for use with any one of a variety of different types of boring bars.

Still another object of this invention is to provide a novel method of producing an adjustable boring bar cartridge of the type described, and which method minimizes the need for the accurate machining of various parts which are utilized in producing the adjusting mechanism for the cartridge.

Other objects of the invention will be apparent hereinafter from the specification and from the recital of the appended claims,particularly when read in conjunction with the accompanying drawings.

SUMMARY OF THE INVENTION

A tubular cartridge housing has a tubular tool carrier mounted coaxially in its bore for limited axial adjustment by a micrometer spindle, which is mounted to rotate coaxially in the bore in the housing adjacent one end thereof. The spindle has on its inner end an externally threaded shank that threads into the bore of a sleeve nut that is injection molded into one end of the bore in the tool carrier, and has in its outer end a socket for accommodating a wrench which can be used to rotate the spindle, and thereby to effect axial adjustment of the tool carrier relative to the surrounding housing.

A tool bit or insert holder, which is removably mounted on the opposite end of the tool carrier, seats in registering notches in the adjacent ends of the housing and tool carrier, respectively. The holder has in its outer face a tapered counterbore the axis of which is disposed slightly eccentrically with respect to the axis of the screw which is used to secure the holder to the carrier, whereby when the screw is tightened its tapered head shifts the insert slightly laterally to increase the holding force of the screw. Also, a safety ring is injection molded around a thrust bearing which surrounds the micrometer spindle to prevent axial movement thereof relative to the cartridge housing.

In use the cartridge is removably secured in a transverse bore in the head of a boring bar, and any adjustment of the tool bit is made axially relative to the cartridge housing, and hence radially of the boring bar.

THE DRAWINGS

PREFERRED EMBODIMENTS OF THE INVENTION

Figure 1:
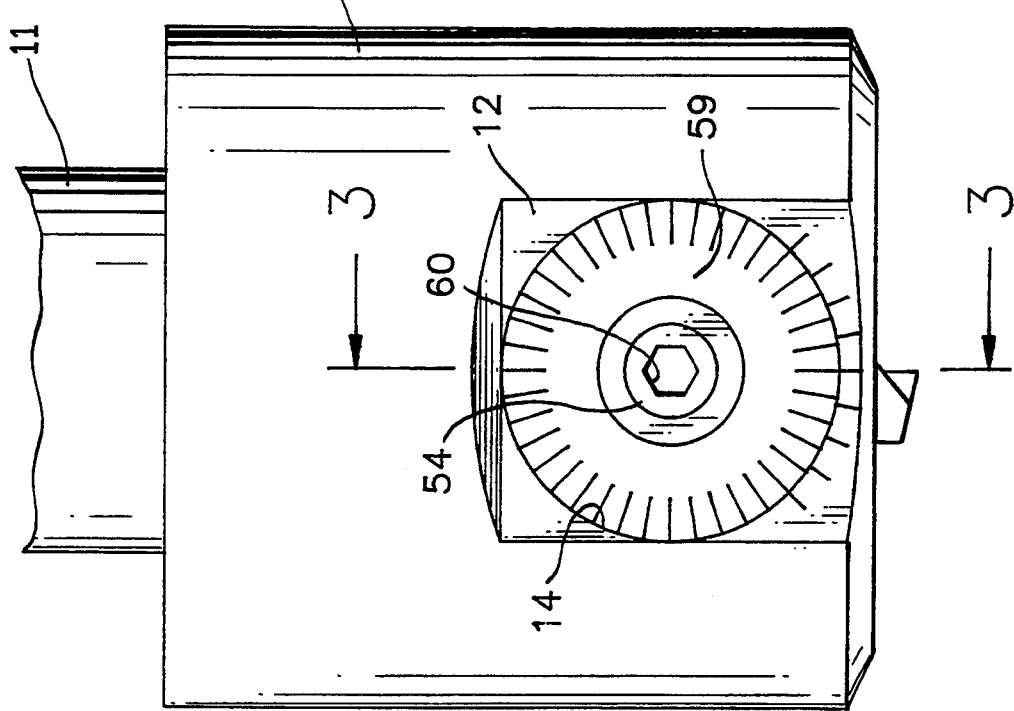
FIG. 1 is a fragmentary elevational view of one side of the head of a boring bar containing a tool cartridge made according to one embodiment of this invention.

Referring now to the drawings by numerals of reference, 10 denotes the cylindrically shaped head of a boring tool having on its upper end (FIGS. 1 and 2) an integral, reduced-diameter shank section 11 that is disposed to be attached in known manner in the bore of a boring tool arbor (not illustrated). At its lower end a chordal portion of the head 10 is cut away to form on one side thereof (the left side as shown in FIG. 3) a flat, tangential surface 12. Adjacent its lower end the head 10 has therethrough a circular, diametral bore 14, which opens at one end on the flat surface 12 and at its opposite end on the outer peripheral surface of the head. A tubular cartridge housing or sleeve 16 is removably secured in the bore 14 coaxially thereof by a set screw 17 (FIGS. 2 and 4), which threads into an internally threaded port or opening 18 formed in the head 10 to open at one end on its outer peripheral surface, and to communicate at its opposite end with the bore 14. Intermediate its ends screw 17 has formed thereon a tapered, truncated conical section 19, which projects into, or seats in, a correspondingly shaped radial opening 20, which is formed through the wall of the cartridge sleeve 16 substantially medially its ends. Section 19 of the set screw 17 merges with a reduced-diameter cylindrical section 21, which is formed on the inner end of the screw 17 for a purpose noted hereinafter.

Opposite its tapered opening 20 the sleeve 16 has formed in its outer periphery an axially extending recess or notch 22 (FIGS. 2 and 4) into which projects the inner end of a set screw 23, which is threaded into another internally threaded port or opening 24 that is formed in the head 10 diametrically opposite the opening 18. The inner end of the screw 23 engages a radially flexible tang or tab 24, which is formed in sleeve 16 by virtue of a generally U-shaped slit or slot 25 (FIG. 4A), which extends from the bottom of the notch 22 through to the bore in sleeve 16. The purpose of this tang 24 will also be described in greater detail hereinafter.

Figure 2:
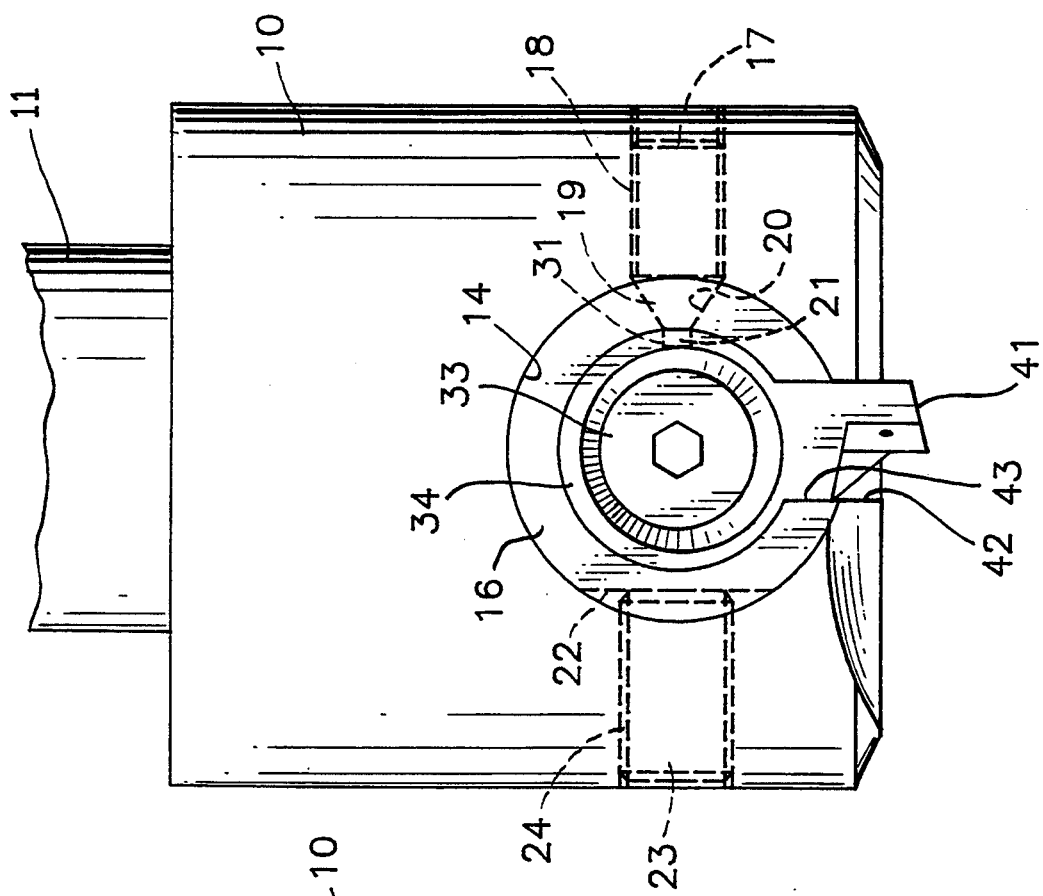
FIG. 2 is a fragmentary elevational view of the opposite side of the head shown in FIG. 1.
Figure 3:
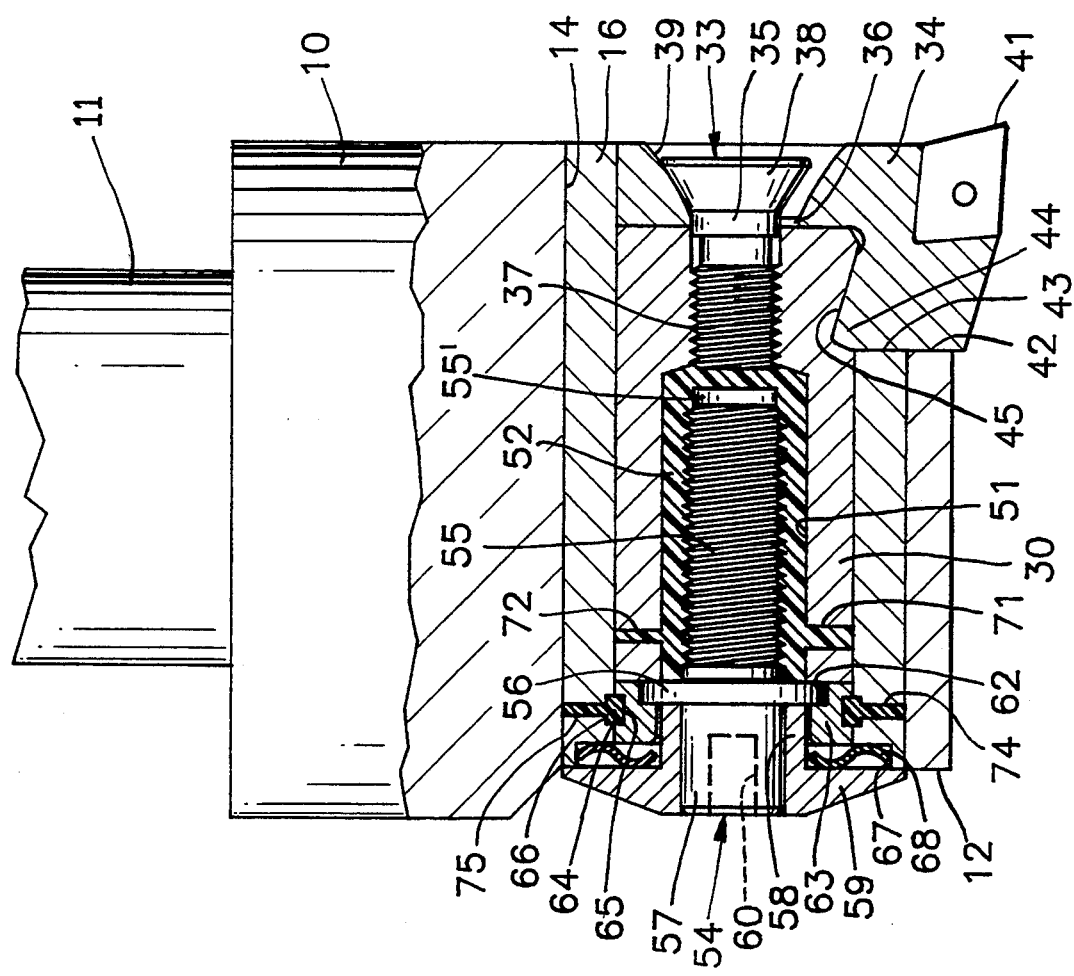
FIG. 3 is a fragmentary sectional view taken generally along the line 3—3 in FIG. 1 looking in the direction of the arrows, portions of the head being shown in full.
Figure 4:
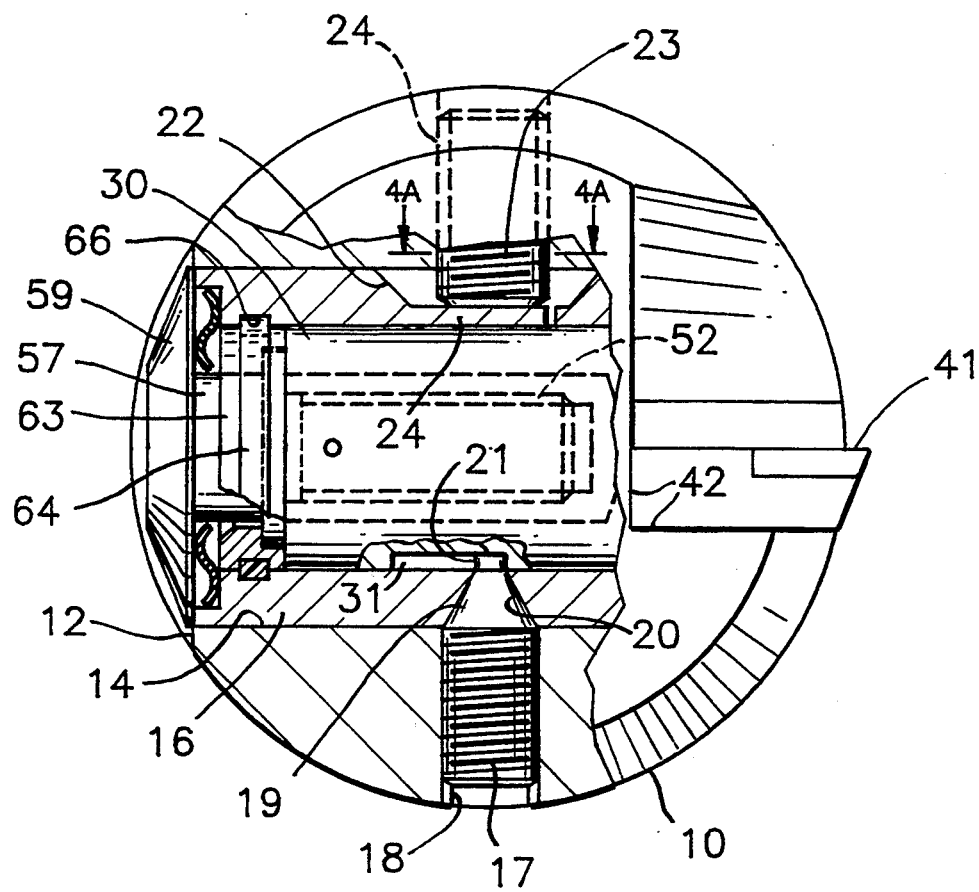
FIG. 4 is a bottom plan view of this head with portions of the head and tool cartridge therein being broken away and shown in section for purposes of illustration.
Figure 4A:
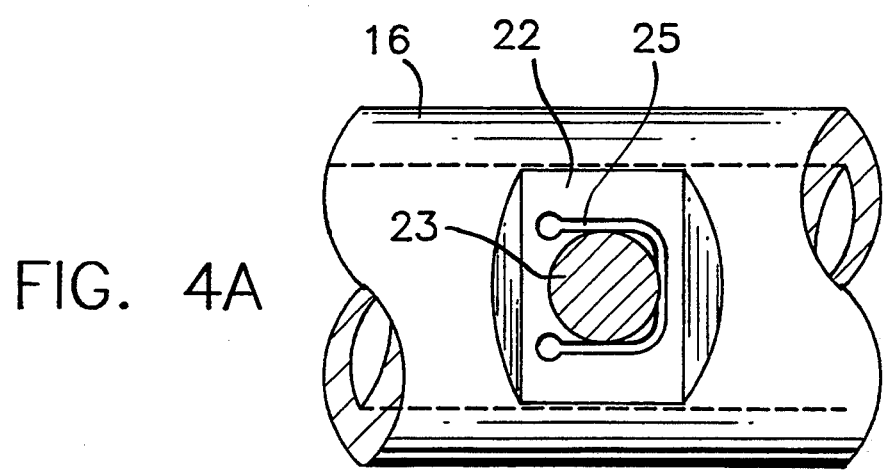
FIG. 4A is a fragmentary sectional view taken generally along the line 4A—4A in FIG. 4 looking in the direction of the arrows, but on a slightly smaller scale.

Mounted for axial adjustment coaxially within the bore of the cartridge sleeve 16 is a tubular tool carrier 30 (FIGS. 3 and 4). Intermediate its ends carrier 30 has in its outer peripheral surface an axially extending keyway or groove 31 (FIGS. 2 and 4) into which projects, slidably, the inner end 21 of the set screw 17. As shown in FIG. 4, when set screw 17 has been threaded into its operative position, its truncated conical section 19 seats snugly in the correspondingly shaped opening 20 in the cartridge sleeve 16 to secure this sleeve against movement in bore 14, while the inner end 21 of screw 17 projects slidably into the way 31 in the tool carrier 30, thus to prevent any rotational movement of the carrier 30 in the bore of sleeve 16, but at the same time to permit, limited axial adjustment of carrier 30 relative to the head 10 as noted hereinafter.

Releasably secured by a screw 33 over one end of the tool carrier 30 (the right end as shown in FIG. 3) is an insert or tool bit holder 34. Intermediate its ends the screw 33 has a cylindrical section 35, which projects through a slightly larger central opening 36 (FIG. 3) in the holder 34, and at its inner end has an externally threaded shank portion 37 which threads securely into a bore formed in the right end of the tool carrier 30 coaxially thereof. At its outer end the screw 33 has a tapered head 38, which has a major portion thereof seated against the surface of a tapered counterbore 39, which is formed in the holder 34 about an axis which is disposed eccentrically of, or slightly radially offset from, the axis of screw 33 for a purpose noted hereinafter.

As shown more clearly in FIGS. 2 and 3, the insert holder 34 has a downwardly projecting bit or tool supporting section 41, which projects beneath the lower end of the head 10 through registering, rectangular notches or recesses 42 and 43 formed in the undersides (FIGS. 2 and 3) of the head 10 and cartridge sleeve 16, respectively. Section 41 also has formed thereon a rearwardly projecting, tooth-shaped projection 44 (FIG. 3) which extends rearwardly of the registering recesses 42 and 43 and upwardly into engagement with an inclined notch 45, which is formed in the underside of the tool carrier 30 as shown in FIG. 3. As the screw 33 is threaded snugly into the tool carrier 30, it secures the insert 34 firmly against the confronting, right end of the carrier 30, and its tapered head 38, because it is disposed eccentrically of the counterbore 39 in the insert holder 34, causes the holder to draw its tooth-shaped section 44 snugly against the inclined surface of the notch 45, thereby substantially eliminating any slight play or motion which might otherwise occur as between the holder 34 and carrier 30 during use of the tool.

Secured in a counterbore 51 (FIG. 3) formed in the end of the carrier 30 opposite to that containing the screw 33 is an injection molded sleeve nut 52 (FIGS. 3 and 4), which is produced by a process that will be noted in greater detail hereinafter. Numeral 54 (FIG. 3) denotes a rotatable micrometer spindle having an externally threaded inner end or shank 55, which is threadably engaged with corresponding threads formed in the axial bore in the sleeve nut 52. Intermediate its ends the spindle 54 has formed thereon an external, circumferential flange 56, which overlies the outer or left end of the sleeve 52 as shown in FIG. 3. Moreover, the outer diameter of flange 52 is slightly greater than the diameter of the bore 51 in the tool carrier 30, so that a portion of the flange 55 also overlies part of the outer or left end of the tool carrier 30, also as shown in FIG. 3.

Micrometer spindle 54 also has an integral, cylindrical head portion 57, which has a diameter smaller than that of the flange 55, and which projects coaxially beyond the flange and the plane, flat surface 12 on head 10. Press fit coaxially on the head 57 of the spindle 54 is the reduced-diameter hub section 58 of a circular dial 59, which has a plane, rear face or surface that is seated rotatably against the end of the tubular cartridge housing 16 remote from the insert holder 34. As noted more clearly in FIG. 1, the outer face of the dial 59 is inscribed with a plurality of spaced calibrations for a purpose noted hereinafter. Also for a purpose noted hereinafter, the spindle head 57 has in its outer end a conventionally shaped socket or recess 60 for accommodating a wrench which can be used adjustably to rotate the spindle 54 and its attached dial 59.

To secure the spindle 54 and the attached dial 59 for rotational adjustment coaxially of the bore in the sleeve nut 52, and to prevent any axial movement of the spindle during such rotation, the spindle flange 56 is seated in a counterbore 62 (FIG. 3) formed coaxially in the inner end of an annular, bronze thrust bearing 63, which at one end surrounds the flange 56 and at its opposite end the hub section 58 of the dial 59. As shown more clearly in FIG. 3, the bearing 63 is secured against axial movement in the bore of housing 16 by an injection molded lock ring 64, which is seated at opposite sides thereof (at its inner and outer peripheral surfaces, respectively) in registering, circumferential grooves 65 and 66 that are formed, respectively, in the outer peripheral surface of the bearing 63 and in the inner peripheral surface of the cartridge housing 16. The 30 plastic lock ring 64 thus retains the bearing 63 over the left end of the housing 16, and against the flange 56, so that when the micrometer spindle 54 is rotated the spindle is fixed against axial movement. During such rotation, however, the sleeve nut 52 is caused to be shifted axially relative to the micrometer spindle 54 and to the surrounding tool carrier 30, and consequently the insert 34 is shifted axially in housing 16 in one direction or the other depending upon the direction of the rotation of the spindle 54.

Seated in a shallow counterbore 67 (FIG. 3) formed in the end of the cartridge housing 16 remote from the insert holder 34 is a flexible wave spring 68, which surrounds the hub section 58 of the dial 59 between the dial and the bearing 63. Spring 68 keeps flange 56 on spindle 54 seated in the recess 62 in bearing 63 whenever carrier 30 is adjusted away from bearing 63.

Referring now to the manner in which the plastic sleeve nut 52 is incorporated into the tool carrier 30, carrier 30, before being mounted in the cartridge housing 16, is secured in a stationary position in a tool jig or the like with the internally threaded bore in its right end (FIG. 3) sealed by a dummy plug (not illustrated), which can be used in place of the screw 33. The micrometer spindle 54 is also secured in the fixture in such a manner that its externally threaded shank portion 55 projects coaxially into the bore 51 in the stationary tool carrier 30, and with the flange 56 on the spindle sealingly engaged with the left end of carrier 30. The bore 51 in the carrier 30 is thus completely sealed at one end (the right end in FIG. 3) by a removable plug, and at its opposite end by the flange 56. At this time also the externally threaded shank 55 of the spindle is maintained in radially spaced coaxial relation to the bore 51 in carrier 30, while its inner end 55', which as noted in FIG. 3 is cylindrical and does not have any threads formed thereon, is disposed in axially spaced relation to the inner end of the plug which seals the right end of the carrier 30.

After the carrier 30 has been so mounted, a plastic material containing metal particles, for example materials of the type sold under the trademarks DEVCON or MOGLICE, is injected under pressure through a radial opening 71 (FIG. 3) in carrier 30, thus filling the entire space around the outside of the externally threaded spindle shank 55, and thus forming, when the plastic cools, the plastic sleeve nut 52. Since the plastic material is injection molded, the threads formed by the molding process on the inner peripheral surface of the sleeve nut 52 exactly conform to the external threads on the spindle shank 55, so that substantially all backlash which otherwise might result as between the spindle 54 and the surrounding tool carrier 30, is substantially eliminated. In addition to the port 71 through which the plastic material is injected into the tool carrier 30, the annular wall of the carrier also has therethrough a second, smaller radial port 72 (FIG. 3), which permits air to be vented from within the bore of the carrier 30 during the injection molding process.

The plastic lock ring 64 is also formed by an injection molding process. To this end, after the sleeve nut 52 has been formed in the carrier 30, the carrier is positioned within the bore of the cartridge housing 16, as shown for example in FIG. 3, after which the bronze bearing 63 is inserted over the head 57 of the spindle 54, the spring 68 is then inserted in the recess 67, and the dial 59 is then press fit over the spindle head 57. Then, before the housing 16 is inserted into the head 10, the housing 16 is secured in a fixture or jig in such a manner that the dial 59 is secured against any axial movement relative to the spindle 54. Plastic material of the type noted above (for example DEVCON or MOGLICE) is then injection molded through a radial port 74 (FIG. 3), which is formed through the annular wall of the housing 16 to communicate with the annular recess 66 in the bore of housing 16, and the registering annular recess 65 formed in the thrust bearing 63. When this plastic cools the ring 64 thus secures the bearing 63 against axial movement over the flange 56 and the adjacent end of the tool carrier 30. To permit air from being vented from the recess 66 during this injection molding process, another, smaller radial port 75 is formed in the housing 16 substantially diametrally opposite the port 74.

In use, the head 10 is secured by a shank 11 into the rotatable driving arbor of a boring tool, or the like, so that the insert or tool bit (not illustrated), which is fixed in a conventional manner in a recess in the insert holder 34, can be rotated in a working manner in the internal bore of the workpiece which is to be bored. If it is desired to adjust the insert holder 34, and hence the associated tool radially relative to the axis of rotation of the head 10, the set screw 23 is first backed off or released slightly to remove the radial pressure exerted by the tang 24 on the outer peripheral surface of the tool carrier 30. The axial adjustment of the tool carrier can then be effected by inserting a wrench into the opening 60 of the spindle head 57, and rotating the spindle 54 in one direction or the other, noting the amount of rotation by virtue of the radially spaced graduations which are formed on the face of the dial 59 to register with one or more corresponding graduations formed on the head 10. During such adjustment the tip 21 on screw 17 prevents any rotation of the carrier 30, and, the screw 33, by virtue of engagement of its tapered head 38 with the tapered recess 39 in the insert holder 34, very securely and accurately retains the insert against and movement relative to the tool carrier 30. After the adjustment has been completed, the set screw 23 should be retightened so that the tang 24 will assist in preventing any undesirable axial movement of the carrier 30 during use.

By injection molding the sleeve nut 52 and lock ring 64 in the cartridge housing 16, a greater degree of accuracy is achieved upon adjustment of the tool carrier 30. Moreover, the plastic lock ring 64 functions as a safety ring, and permits the tool holder 30, if need be, to shear the plastic ring 64 and permit carrier 30 to pass out at the left end of the cartridge housing 16 in the event that any excessive overloading of the tool takes place during use.

One of the principal advantages of the present invention is that the head 10 and the cartridge housing 16, and its contents, can be sold as a unit, or, if desired, the removable cartridge 16 and its associated parts can be sold separately for use in various types of boring tools or bars.

Figure 5:
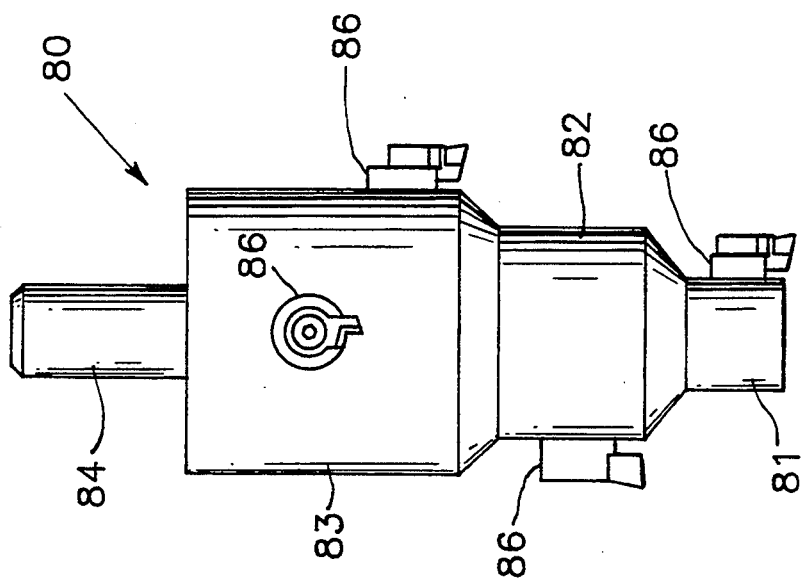
FIG. 5 is an elevational view of a boring bar having mounted therein a plurality of tool cartridges of the type made in accordance with this invention.

For example, as shown in FIG. 5, 80 denotes generally a boring bar having a series of heads 81, 82 and 83 of progressively different sizes—i.e., having progressively greater outside diameters, and an integral shank 84 for securing the bar to an associated arbor (not illustrated). Removably mounted in each head 81, 82 and 83 are one or more cartridge housings 86, each of which, except for variations in the sizes thereof, would be similar to cartridge housing 16, and would contain the same elements as those illustrated in FIGS. 3 and 4. In the case of the bar 80, therefore, the various cartridges 86 would be removably mounted in the associated heads 81, 82 and 83 for radial adjustment thereof in substantially the same manner as shown in FIGS. 3 and 4.

From the foregoing, it will be readily apparent that the present invention provides a relatively simple but extremely accurate means for adjustably mounting insert carriers in a boring bar or the like. By utilizing injection molded sleeve nuts, such as sleeve nut 52, any undesirable backlash which might otherwise occur during adjustment of the associated insert holder is substantially eliminated. In addition, by utilizing in the insert holder 34 the counterbore 39, which is eccentrically located relative to the axis of screw 33, the latter screw functions to secure the insert holder 34 firmly against both radial and axial movement during use of the associated tool. Moreover, by utilizing the injection molded plastic locking ring 64, any accidental overloading of the associated tool can be accommodated by virtue of the safety feature of the ring 64, which will shear at a predetermined value, thereby to prevent any extreme damage to the associated boring bar.

While this invention has been illustrated and described in detail in connection with only certain embodiments thereof, it will be apparent that it is capable of still further modification, and that this application is intended to cover any such modifications as may fall within the scope of one skilled in the art, or the appended claims.

I claim:

1. A boring tool comprising
   a head having thereon a shank for connecting the head to a machine arbor for rotation thereby about a first axis,
   a cartridge housing removably secured in a bore formed in said head to extend transversely of said first axis,
   a tool carrier mounted in an axial bore in said housing for limited adjustment axially thereof,
   a cutting insert holder secured to one end of said carrier and projecting therefrom into the bore in said housing adjacent one end thereof,
   an adjusting screw rotatably mounted adjacent one end thereof in the opposite end of said bore in said housing, and having thereon an externally threaded shank projecting coaxially and in radially spaced relation into an axial bore formed in the end of said tool carrier remote from said insert holder, and
   a plastic sleeve nut secured in and filling the radial spaced formed in said bore in said tool carrier between the threaded shank of said adjusting screw and the surrounding bore wall in said tool carrier,
   said sleeve nut having an internally threaded bore the threads of which are accurately and drivingly engaged with the threads on said screw shank, whereby when said screw is rotated said insert holder is adjusted axially of said cartridge housing, and
   said sleeve nut further having an integral portion thereof extending through a radial opening formed in said tool carrier to open at one end on the bore in said carrier and at its opposite end on the exterior of said carrier.

2. A boring took as defined in claim 1, wherein said sleeve nut is an injection molded plastic material containing metal particles.

3. A method of producing a boring tool cartridge of the type having a tool carrier mounted for limited axial adjustment in the bore of a cartridge housing via a rotatable adjusting screw, comprising the steps of:
   supporting the externally threaded shank of an adjusting screw in one end of an axial bore in a tool carrier so that the head of said screw projects out of said one end of said bore, and so that said shank is disposed in radially spaced coaxial relation to the inner peripheral surface of the bore in said carrier,
   sealing opposite ends of said bore in said carrier,
   injection molding a plastic material into the radial space in said bore in said carrier and around the outside of said shank, and
   rotatably supporting the head of said adjusting screw against axial movement in the bore of an annular bearing which is positioned in the bore in said cartridge housing so that an annular recess in the outer periphery of said bearing registers coaxially with and confronts upon an annular recess formed in the wall of said cartridge housing bore, and
   injection molding a plastic ring into the annular space formed by said confronting annular recesses in said bearing and said housing bore, respectively, thereby to secure said bearing against axial movement relative to the bore in said housing.

4. A boring tool as defined in claim 1, including
   a second screw releasably securing said insert holder to said one end of said carrier,
   said second screw having a shank portion extending through a central opening in said insert holder, and having a truncated conical shaped head seated in a tapered counterbore in said holder coaxially of said central opening therein,
   the axis of said counterbore being slightly radially offset relative to the axis of said second screw whereby the head of said second screw is disposed eccentrically relative to said counterbore to apply lateral pressure to said insert holder when seated in said counterbore.

5. A boring tool comprising
   a head having thereon a shank for connecting the head to a machine arbor for rotation thereby about a first axis,
   a cartridge housing removably secured in a bore formed in said head to extend transversely of said first axis,
   a tool carrier mounted in an axial bore in said housing for limited adjustment axially thereof,
   a cutting insert holder secured to one end of said carrier and projecting therefrom into the bore in said housing adjacent one end thereof,
   an adjusting screw rotatably mounted adjacent one end thereof in the opposite end of said bore in said housing, and having thereon an externally threaded shank projecting coaxially and in radially spaced relation into an axial bore formed in the end of said tool carrier remote from said insert holder, and
   a plastic sleeve nut secured in and filling the radial spaced formed in said bore in said tool carrier between the threaded shank of said adjusting screw and the surrounding bore wall in said tool carrier,
   said sleeve nut having an internally threaded bore the threads of which are accurately and drivingly engaged with the threads on said screw shank, whereby when said screw is rotated said insert holder is adjusted axially of said cartridge housing,
   said cartridge housing being generally tubular in configuration and having formed through its annular wall an elongate slot forming in said wall intermediate the ends thereof a radially flexible tab one side of which confronts on said tool carrier, and the other side of which confronts the inner end of a first radial opening in said head, and
   a first set screw adjustably threaded in said first radial opening in said head selectively to have its inner end engage and flex said tab radially inwardly into locking engagement with said tool carrier.

6. A boring tool as defined in claim 5, including a second set screw adjustably threaded in a second radial opening in said head to extend intermediate its ends into a registering opening in said housing removably to secure said housing against movement relative to said head.

7. A boring tool as defined in claim 6, wherein said second screw has on the inner end thereof a projection which extends slidably into an axially extending groove in the outer surface of said tool carrier, thereby to secure said carrier against rotation relative to said housing, and to guide said carrier for limited axial adjustment relative to said housing.

8. A boring tool comprising
   a head having thereon a shank for connecting the head to a machine arbor for rotation thereby about a first axis, a cartridge housing removably secured in a bore formed in said head to extend transversely of said first axis, a tool carrier mounted in an axial bore in said housing for limited adjustment axially thereof, a cutting insert holder secured to one end of said carrier and projecting therefrom into the bore in said housing adjacent one end thereof, an adjusting screw rotatably mounted adjacent one end thereof in the opposite end of said bore in said housing and having thereon an externally threaded shank projecting coaxially and in radially spaced relation into an axial bore formed in the end of said tool carrier remote from said insert holder, and a plastic sleeve nut secured in and filling the radial spaced formed in said bore in said tool carrier between the threaded shank of said adjusting screw and the surrounding bore wall in said tool carrier, said sleeve nut having an internally threaded bore the threads of which are accurately and drivingly engaged With the threads on said screw shank, whereby when said screw is rotated said insert holder is adjusted axially of said cartridge housing, means for retaining said rotatable adjusting screw against axial movement relative to said housing, said means including an annular thrust bearing having an internal, circumferential flange projecting into an annular recess formed in said adjusting screw adjacent said one end thereof, and a plastic safety ring surrounding said thrust bearing and having an internal circumferential portion thereof seated in an annular groove formed in the outer periphery of said bearing, and having an outer circumferential portion thereof seated in an internal annular recess formed in the bore of said housing.

9. A boring tool as defined in claim 8, wherein said safety ring is an injection molded plastic material containing metal particles.

10. A boring tool as defined in claim 8, wherein an integral portion of said ring extends into a radial opening formed in the wall of said housing to open at one end on the bore in said housing and at its opposite end on the exterior of said housing.

11. A cartridge for removably and adjustably mounting a cutting insert on the head of a boring tool, comprising a cylindrical cartridge housing disposed to be releasably mounted in a transverse bore in the head of a boring tool, a tool carrier mounted for axial adjustment in an axial bore in said housing, a cutting insert holder secured to one end of said tool carrier, an adjusting screw having at one end thereof, an externally threaded shank extending coaxially and in radially spaced relation into an axial bore formed in the opposite end of said carrier, means mounting said screw adjacent the opposite end thereof in said housing for rotation coaxially of the bore in said carrier, and operative to retain said screw against axial movement relative to said housing, and a plastic sleeve nut fixedly molded in and filling the radial space in said carrier around the outside of said screw shank, said nut having thereon internal threads accurately and drivingly connected with the external threads on said screw shank, whereby upon rotation of said adjusting screw said sleeve nut, and the attached tool carrier and insert holder are adjusted axially in said bore in said housing, said mounting means comprising an annular thrust bearing surrounding said adjusting screw adjacent said opposite end thereof, and having thereon an internal circumferential flange portion seated in an annular groove formed in the periphery of said adjusting screw externally of the bore in said carrier, and a plastic safety ring surrounding said thrust bearing coaxially thereof, said safety ring having an internal circumferential portion thereof seated in an annular groove formed in the outer periphery of said thrust bearing, and an outer circumferential portion thereof seated in a registering, internal annular recess formed in the bore in said housing.

12. A cartridge as defined in claim 11, wherein an integral portion of said sleeve nut projects into a radial opening in said tool carrier.

* * * * *